United States Patent [19]
Purman

[11] 3,805,101
[45] Apr. 16, 1974

[54] REFRIGERANT COOLED ELECTRIC MOTOR AND METHOD FOR COOLING A MOTOR
[75] Inventor: Joseph W. Purman, Milwaukee, Wis.
[73] Assignee: Litton Industrial Products, Inc., Milwaukee, Wis.
[22] Filed: July 3, 1972
[21] Appl. No.: 268,481

[52] U.S. Cl. ................................... 310/54, 62/505
[51] Int. Cl. ............................................. H02k 9/00
[58] Field of Search ............ 310/54, 58, 59, 64, 65; 62/505, 197

[56] References Cited
UNITED STATES PATENTS
3,218,825  11/1965  McClure ............................. 62/505
3,388,559   6/1968  Johnson .............................. 310/54
3,088,042   4/1963  Robinson ............................ 310/54
3,158,009  11/1964  Rayner ............................... 310/54
3,675,056   7/1972  Lenz .................................. 310/54
3,188,833   6/1965  Robinson ............................ 310/54
3,149,478   9/1964  Anderson ............................ 310/54
3,150,277   9/1964  Chubb ............................... 310/54

Primary Examiner—R. Skudy

[57] ABSTRACT

An electric motor cooled by a fluid such as a liquid refrigerant having a chamber between a stator assembly and a casing for cooling the stator assembly and for directing the coolant into radial passages in the stator assembly. Coolant flows through radial passages in the stator assembly and subsequently into a gap between the rotor assembly and the stator assembly and out of the motor. A method of cooling an electric motor wherein the direct contact of the coolant with internal portions of the stator assembly increases the efficiency of the cooling process.

17 Claims, 8 Drawing Figures

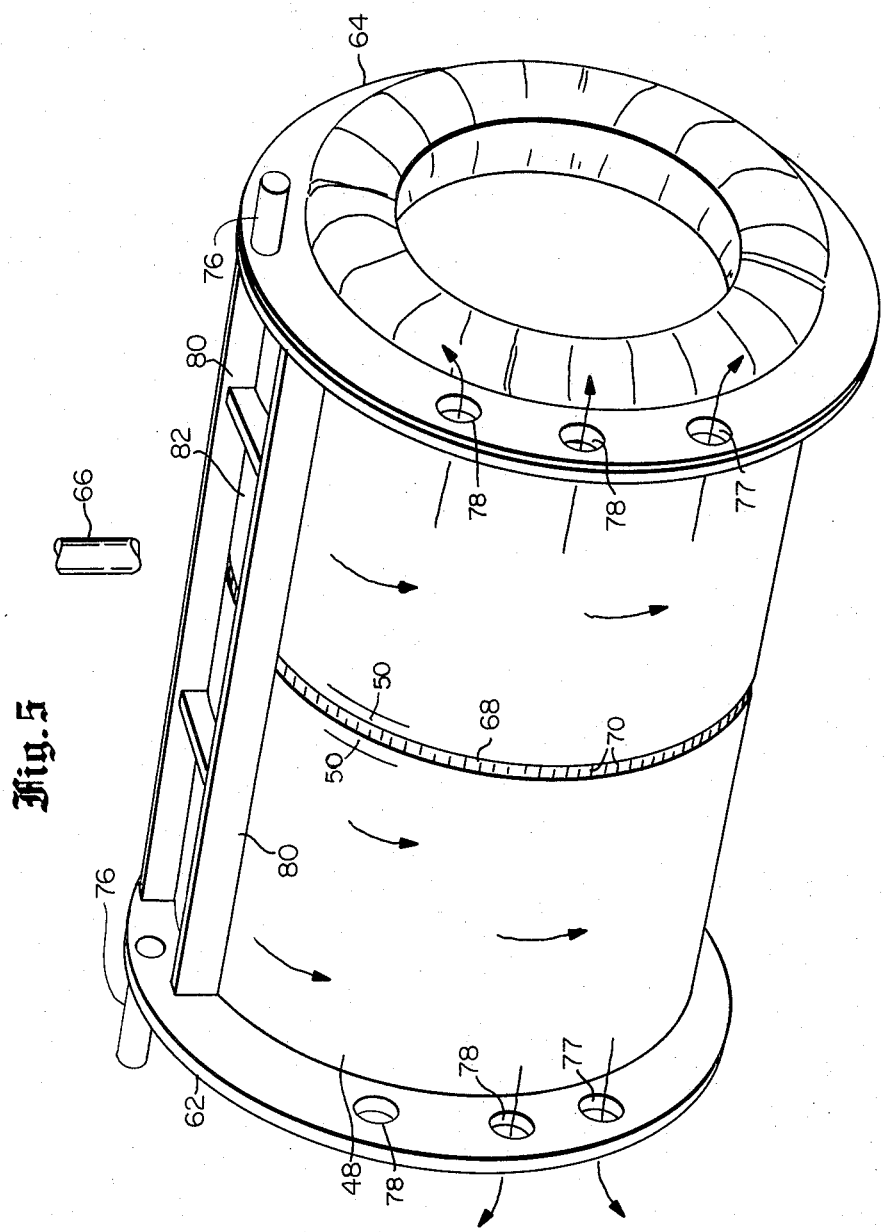

REFRIGERANT COOLED ELECTRIC MOTOR AND METHOD FOR COOLING A MOTOR

BACKGROUND OF THE INVENTION — FIELD OF THE INVENTION

The present invention relates to improvements in the cooling of dynamo-electric machines, and more particularly to an electric motor encased in a hermetically sealed enclosure and to a method for cooling an electric motor.

BACKGROUND OF THE INVENTION—DESCRIPTION OF THE PRIOR ART

Hermetically sealed motors are often used in refrigeration systems to drive the system compressor thereby to facilitate the sealing of the system. Because the hermetically sealed enclosure impedes cooling of such motors by conventional means, the motors have been cooled by using a coolant, typically the system refrigerant, as a heat exchange medium.

The size and cost of hermetically sealed motors are often dependent upon the cooling system. The more inefficient the cooling system, the higher the cost and/or the larger the size of the hermetically sealed motor.

In the past, in order to provide and maintain adequate amounts of refrigerant in the motor, it has often been necessary to establish a physical relationship between the motor and the portions of the refrigeration system from which the refrigerant is taken and returned. This has proven restrictive in the design and packaging of the refrigeration system. Other techniques have employed level controls, such as float valves and the like, in the refrigeration system to provide and maintain adequate amounts of refrigerant in the motor. However, such level control apparatus increases the cost and complexity of the motor and refrigeration system.

SUMMARY OF THE PRESENT INVENTION

The present invention overcomes the above and other disadvantages of the prior art are overcome by providing a motor having a sealed casing; a stator assembly mounted in the casing to define a gap therebetween; a rotor assembly mounted in the motor to rotate inside the stator assembly; a means for enclosing at least a portion of the gap between the stator assembly and the casing to define a chamber for containing a coolant, an inlet means for providing a liquid into the coolant chamber; and an outlet means connected to the casing for removing coolant from the motor. The stator assembly has a plurality of circumferentially spaced, radial passages from the coolant chamber to a gap between the rotor assembly and the stator assembly for discharging coolant into this gap and by providing a method for cooling such an electric motor. It is, therefore, the object of the present invention to provide a hermetically sealed motor suitable for cooling by a liquid coolant in a highly efficient uniform manner but without the requirement for level control apparatus for the coolant.

DESCRIPTION OF THE DRAWINGS

FIG. 5 is a perspective of an alternate embodiment of the owner of the invention.

DESCRIPTION OF THE PREFERRED EMBODIMENT

Figure 1:
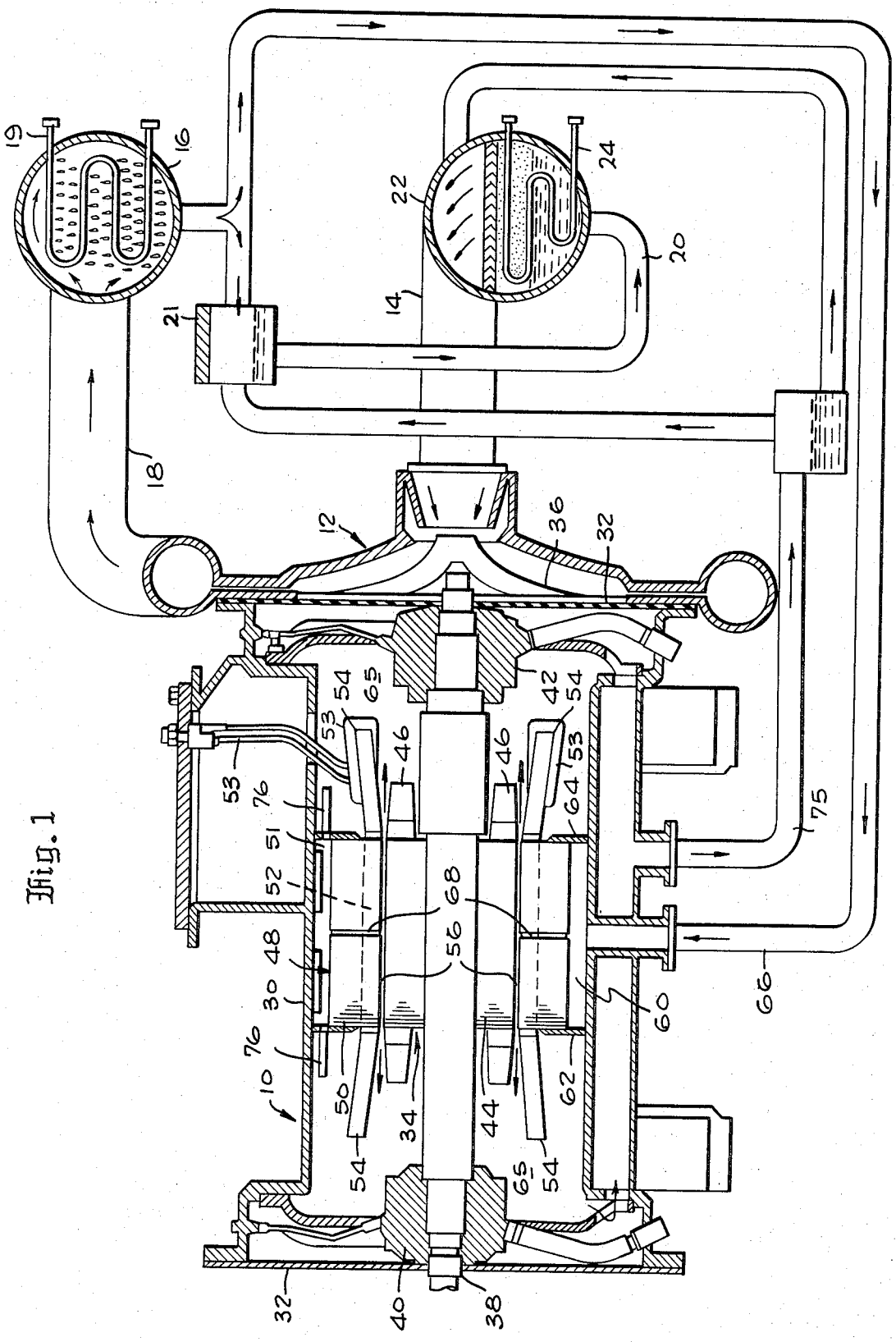
FIG. 1 is a view partially in section of a motor of the invention and partially a flow diagram showing associated equipment.

Referring to the drawings, FIG. 1 shows a refrigeration system including hermetically sealed motor 10 mounted to drive compressor 12. Vaporized refrigerant, such as freon, enters compressor 12 through pipe 14, becomes compressed, and passes to condenser 16 through pipe 18. A cooling medium is circulated through condenser 16 through coil 19 to condense the coolant into liquid form, in which form it exits through pipe 20. Pipe 20 supplies liquid coolant to evaporator 22. A system economizer 21 may be interposed along pipe 20 if desired. A secondary medium, such as water, connected to the cooling load, is passed through evaporator 22 in tubing 24 and provides heat for evaporating the coolant into vapor which exits through pipe 14 and returns to compressor 12, thereby completing the normal refrigeration cycle. The specific construction and operation of the compressor, condenser, evaporator, and other portions of the refrigeration system are well known to those skilled in the art and further description thereof is deemed unnecessary. It will also be appreciated that, while a single stage compressor is shown and described herein, the refrigeration system may incorporate a multi-state compressor, if desired.

As shown in FIG. 1, motor 10 is of the totally enclosed type having a cylindrical casing 30 enclosed at the ends by end wall 32 and compressor 12. A rotor assembly 34 is mounted within motor 10 and drives impeller 36 within compressor 12. Rotor shaft 38 is supported by a suitable bearing and bracket 40 mounted in casing 30 and by a similar bearing 42 adjacent to compressor 12. Rotor assembly 34 contains a plurality of rotor laminae 44 attached in secured engagement to shaft 38. Rotor assembly 34 further includes a conventional squirrel cage motor winding having shorting end rings to which may be attached axially extending fan blades 46 to circulate the coolant, as hereinafter more so fully described.

A tubular stator assembly 48 surrounds rotor assembly 34 and is formed of a plurality of cylindrical stator laminate 50. A stator assembly 48 may be spaced from casing 30 by one or more bars 51 each having a pair of slots therein, as shown in FIG. 1. A gap exists between the stator assembly and casing 30. Laminae 50 are customary design and contain coil slots for positioning stator windings 52 having end turns 54. Windings 52 are energizable by cables 53 from an external power source (not shown) for effectuating electro-mechanical energy conversion across gap 56 in a manner well known in the art.

An annular chamber 60 for containing a coolant is formed within motor 10 to embrace stator assembly 48. Annular chamber 60 is formed by annuli or discs 62 and 64 mounted in sealing engagement at each end of stator assembly 48 (enclosing the ends of the gap between the stator assembly and the casing). Annuli 62 and 64 extend between the exterior of stator assembly 48 and the interior of casing 30. Annuli 62 and 64 divide the volume bounded by casing 30, stator assembly 48, and rotor 34 into annular chamber 60 and a pair of remaining end spaces 65 each bounded by a portion of the interior surface of casing 30, and end surface of stator assembly 48, and an end surface of rotor assembly 34.

A coolant such as a liquid refrigerant is supplied to annular chamber 60 through pipe 66 which is connected to pipe 20. The coolant may be conveniently supplied at either the top or the bottom of annular chamber 60, or anywhere around the chamber, and is shown connected to the bottom of the annular chamber in FIG. 1.

An outlet from chamber 60 is provided by one or more vents 68 in stator assembly 48. Vent 68 may be formed by a plurality of spacers 70 inserted between the opposed laminae 50 on either side of vent 68 to form a plurality of radial passages from the exterior of stator assembly 48 to gap 56. The radial passages forming a vent 68 preferably are co-planar. Of course, the passages need not be separate but may communicate with one another in diverse paths from chamber 60 to gap 56. Coolant such as a liquid refrigerant is discharged from chamber 60 through vent 68 to gap 56. It passes through this gap and cools winding 54. A plurality of vents 68 may be utilized by longitudinally spacing them along the rotor axis. In the preferred embodiment the radial passages forming each vent 68 are coplanar and are orthogonal to the axis of revolution of rotor assembly 34.

Figure 2A:
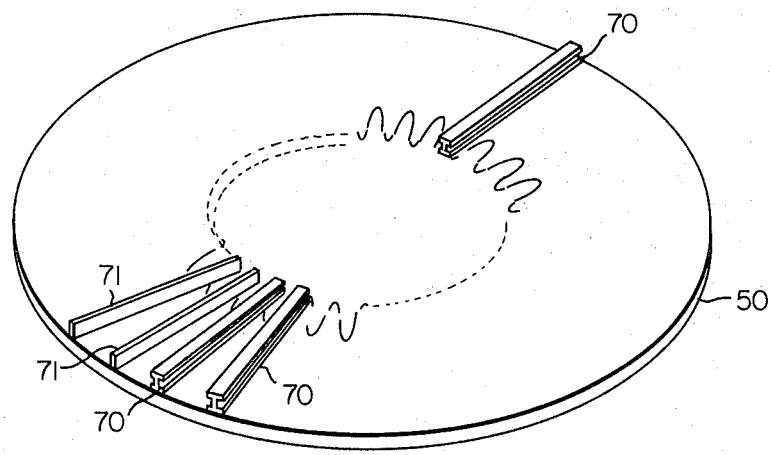
FIG. 2 is a perspective view of a stator lamina and spacers.
Figure 2B:
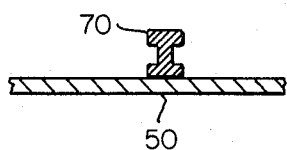
Figure 2C:
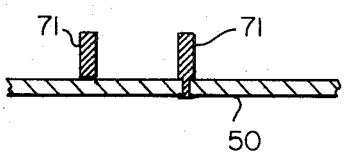

In FIG. 2, a, b, and c there is shown a detailed construction of one means for constructing vent 68. Vent 68 may be formed by a plurality of spacers 70, which may have the shape of an I-beam, inserted between the opposed laminae 50 on either side of vent 68 to form a plurality of radial passages from the exterior of stator assembly 48. Spacers 70 are connected to laminae 50 by welding or riveting. The spacers may have any one of many other shapes such as the steel strip comprising spacers 71, and 71' for example.

Gap 56 is adapted to convey a coolant such as a liquid refrigerant received from vent 68 to space 65 at either end of gap 56. Space 65 comprises a volume at both ends of the motor substantially bounded by a portion of the interior surface of casing 30, the end surfaces of stator assembly 48, the end surfaces of rotor assembly 34, and one side of annuli 62 and 64.

Figure 3:
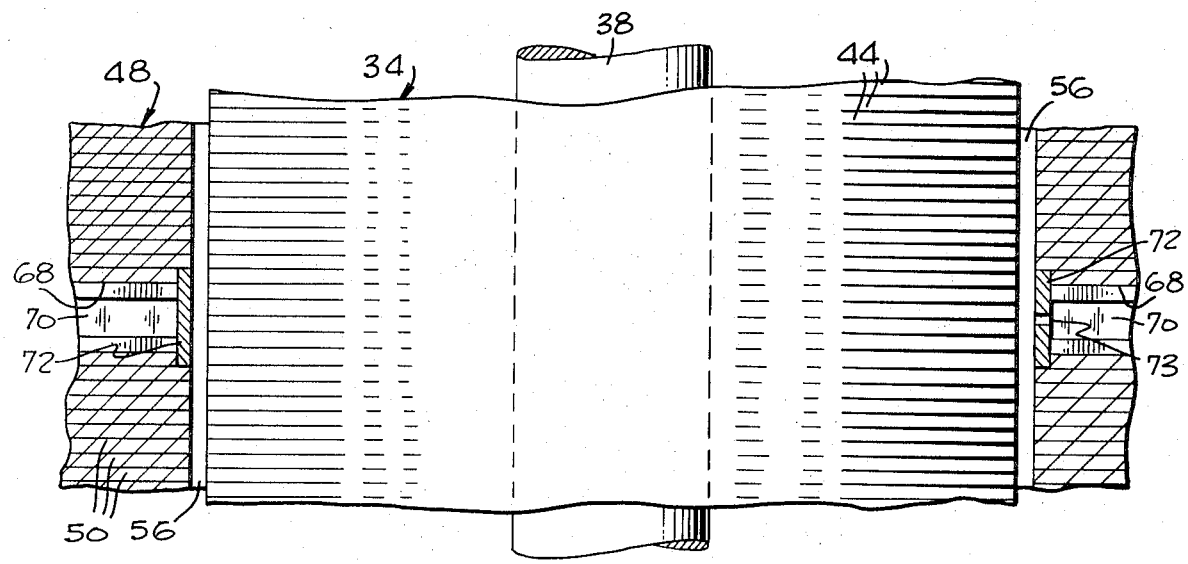
FIG. 3 is a cross section of a portion of a stator and a rotor.

In FIG. 3 there is shown a means for controlling the rate of flow of coolant from vent 68 into gap 56. Orifice ring 72 may be installed in the bore of stator assembly 48 so that vent 68 must discharge through a predetermined number of holes 72 in orifice ring 71. The number and diameter of holes 73 may be chosen to control the rate of flow of coolant through vent 68 and gap 56. Orifice ring 72 will have the effect of reducing the rate of flow of coolant through vent 68.

If on the other hand, it is desired to facilitate the flow of coolant from vent 68 into gap 56, groove 74 in rotor assembly 34 may be placed opposite the opening of vent 68 into gap 56.

Pipe 75 is an outlet from casing 30 for withdrawing coolant which may be a liquid refrigerant or both a liquid and a gaseous refrigerant from casing 30 and for returning it to evaporator 22.

In operation, liquid refrigerant and any gasified refrigerant from pipe 66 is supplied to annular chamber 60 of motor 10 to form a cooling bath for the exterior of stator assembly 48. The refrigerant flows out of annular chamber 60 through vent 68 into gap 56. Liquid refrigerant may be supplied in quantities such that annular chamber 60 will be substantially filled with refrigerant. Or, annular chamber 60 may be filled to any lesser level sufficient to maintain an adequate cooling bath in annular chamber 60 and adequate coolant flow through vent 68. The level of coolant in annular chamber 60 is maintained by the flow rates of the coolant into and out of annular chamber 60. Alternatively, the level of coolant in annular chamber 60 could be maintained by float valves or the position of motor 10 with respect to other elements of the refrigeration system (not shown).

Upon reaching gap 56 between stator assembly 48 and rotor assembly 34, the refrigerant passes axially along the gap, cooling adjacent surfaces of rotor assembly 34 and stator assembly 48. As it exits from gap 56 into space 65, it is directed by the fanning action of rotor blades 46 onto stator end turns 54 of stator winding 52 to remove heat from these portions of the stator winding. Thereafter, refrigeration in the liquid and gaseous form is withdrawn through pipe 75 and returned to evaporator 22.

As shown in FIG. 1, if it is desired to further increase the cooling of stator end turns 54, ducts 76 may be placed in annuli 62 and 64 to open into annular chamber 60 and distribute refrigerant from annular chamber 60 over stator winding end turns 54.

Figure 6:
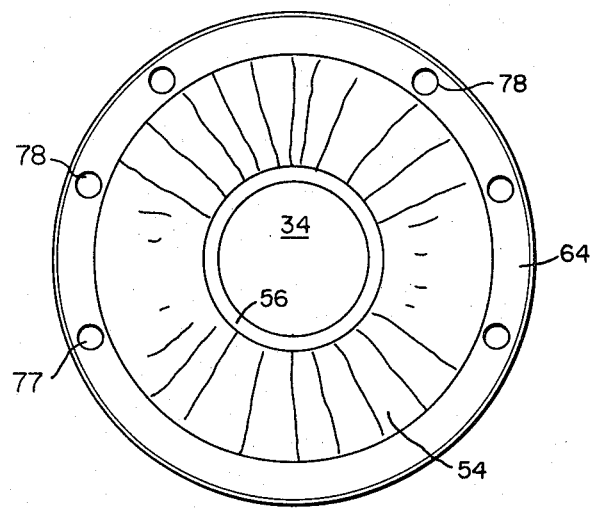

FIGS. 5 and 6 show another embodiment of the present invention in which the liquid refrigerant is supplied to the top of annular chamber 60 by pipe 66. The liquid refrigerant supplied by pipe 66 cascades down the exterior of stator assembly 48 to cool the stator assembly. Portions of the liquid pass through vent 68 to gap 56 to cool the adjacent portions of the rotor and stator assemblies.

Figure 4:
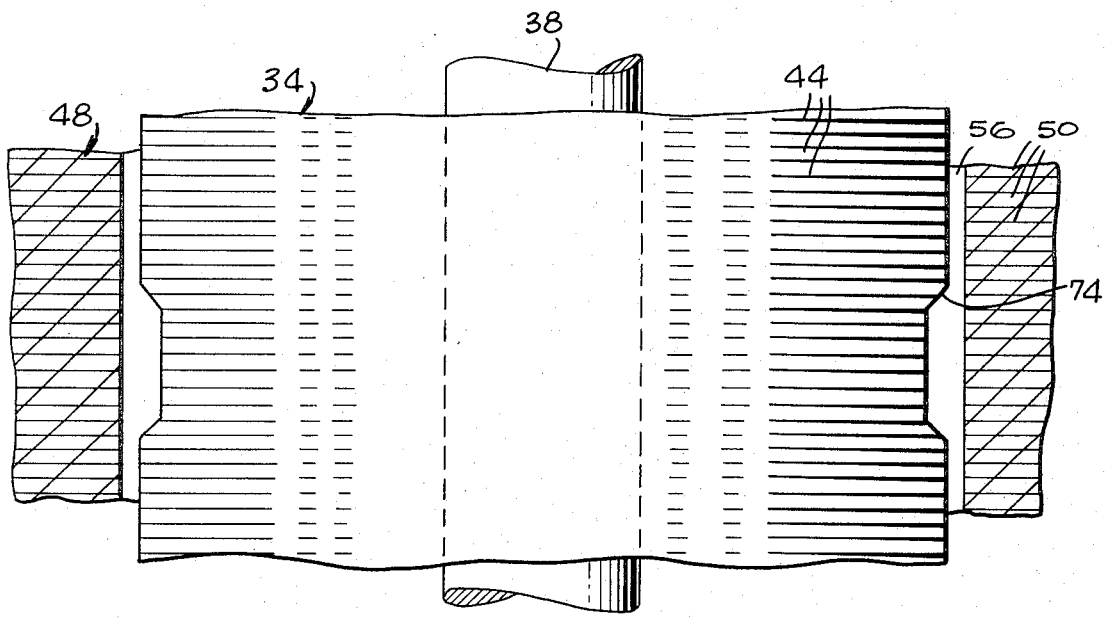
FIG. 4 is a cross section of another rotor and stator.

To maintain the coolant level in annular chamber 60, overflow holes 77 may be drilled in annuli 62 and 64 to spill excess refrigerant into the interior of housing 30 for removal through pipe 75. Holes 77 may be located so as to maintain any desired level of coolant in annular chamber 60. For this embodiment it is preferable to locate holes 77 so that the liquid level in annular chamber 60 will permit some liquid in gap 56 but will not flood the gap, as shown in FIG. 6. In the embodiment of FIGS. 4 and 5, as in the embodiment of FIG. 1, desired coolant levels are maintained in motor 10 without float valves or motor positioning techniques.

If desired, additional holes 78 may be drilled in annuli 62 and 64 to permit refrigerant vaporized by heat from stator assembly 48 to pass over stator end turns 54 into the interior of housing 30 to provide additional coolant to the stator end turns 54. The vaporized refrigerant is removed through pipe 75.

If it is desired to spray liquid refrigerant over stator end turns 54, a pair of spaced baffles 80 may be positioned along the upper portion of stator assembly 48 to collect the liquid refrigerant from pipe 66 to a level limited by the tops of baffles 80. Baffles 80 extend between annuli 62 and 64 to form a trough-like chamber 82. Ducts 76 open into annular chamber 82 between spaced baffles 80 and pour and/or spray liquid refrigerant on stator end turns 54. The refrigerant collected between baffles 80 drains through opening 68 and is discharged over the tops of baffles 80, as shown in FIG.

5, to cool the remaining portions of the stator assembly and flow to the rotating end ring and fan 46 for spray distribution over the winding.

I claim:

1. A dynamoelectric machine comprising:
   a. a sealed casing having at least one inlet for admitting a liquid coolant and at least one outlet for removing the liquid coolant;
   b. an annular stator assembly mounted in said casing, said casing exposing substantial areas of the exterior of said stator assembly in contact with the liquid coolant for cooling said stator assembly, said stator assembly having at least one means for venting liquid coolant radially inward from the exterior of said stator assembly;
   c. means for enclosing at least a portion of said stator for cooling said stator assembly, said enclosure means includes a pair of sealing rings connected in sealing engagement with said stator assembly and said casing to form an annular chamber around the outer circumference of said stator assembly, the annular chamber adapted to accumulate liquid coolant from said inlet, the level of liquid coolant being maintained sufficiently high to at least partially immerse said stator assembly to provide heat transfer from said stator assembly to the liquid coolant; and
   d. a rotor assembly mounted in said motor to rotate within said stator assembly, said rotor assembly and said stator assembly defining a gap therebetween, the gap communicating with said vent means for receiving the liquid coolant therefrom and passing the liquid coolant only axially for cooling said stator assembly and said rotor assembly, the liquid coolant exits from the gap and is removed from said casing through said outlet.

2. The motor according to claim 1 wherein said rotor includes coolant distributing means mounted on the ends thereof for distributing coolant discharged from the gap onto the ends of the stator assembly.

3. The motor according to claim 2 wherein said coolant distributing means comprises a fan means mounted on said rotor assembly.

4. The motor according to claim 1 wherein said enclosure means includes at least one means for discharging coolant from said annular chamber onto at least one end of said stator assembly.

5. The motor according to claim 1 wherein said sealed casing and said rotor and stator assemblies are horizontally disposed and wherein said inlet conduit means is connected in the vicinity of the bottom of said casing.

6. The motor according to claim 1 wherein said sealed casing and said rotor and stator assemblies are horizontally disposed and wherein said enclosure means includes a pair of sealing rings connected to said casing and to said stator assembly to form the annular chamber on the outer circumference of said stator assembly.

7. The motor according to claim 6 wherein said enclosure means includes means for establishing the level of coolant in the annular chamber.

8. The motor according to claim 7 wherein said means for establishing the level of coolant in said annular chamber comprises holes in said sealing rings for permitting the coolant to overflow out of the annular chamber.

9. The motor according to claim 8 coolable by a vaporizable liquid coolant and wherein said sealing rings include additional holes for the passage of vaporized coolant out of the annular chamber.

10. The motor according to claim 6 wherein said sealing rings include duct means for distributing coolant from said chamber onto at least one end of said stator assembly.

11. The motor according to claim 10 wherein said inlet means is located in the vicinity of the top of said casing, and wherein said annular chamber includes means for collecting coolant near the top of said casing, said collecting means forming a coolant collecting trough, coolant being discharged between said collecting means and said casing for cooling said stator assembly, said duct means in said sealing rings distributing coolant from the trough onto the ends of said stator assembly.

12. The motor as claimed in claim 1 wherein said vent means comprises a plurality of radial passages which are substantially co-planar.

13. The motor as claimed in claim 1 wherein said stator has a plurality of vent means, each vent means comprising a plurality of substantially co-planar radial passages.

14. The motor as claimed in claim 12 wherein said rotor assembly has a circumferential groove substantially co-planar with said plurality of passages for increasing the rate of flow coolant through the gap between said rotor assembly and said stator assembly.

15. The motor as claimed in claim 12 and further including means for reducing the rate of flow of coolant from said radial passages to the gap.

16. The motor as claimed in claim 15 wherein said reducing means comprises a ring having a plurality of circumferentially spaced apertures of predetermined size, said ring being mounted on said stator assembly, the apertures in said ring being substantially co-planar with said radial passages in said stator assembly.

17. The motor as claimed in claim 12 wherein said stator assembly includes a plurality of stator laminae and wherein said vent means comprises a plurality of spacers mounted between a pair of laminae for forming a plurality of radial passages from the exterior of said stator assembly and the gap.

* * * * *